United States Patent
Williams, Jr. et al.

[11] Patent Number: 5,444,568
[45] Date of Patent: Aug. 22, 1995

[54] CONSUMER NIGHT VISION VIEWING APPARATUS

[75] Inventors: George M. Williams, Jr., Troutville, Va.; Gary L. Palmer, Bellevue, Wash.; John D. Popow, Roanoke, Va.

[73] Assignee: ITT Corporation, New York, N.Y.

[21] Appl. No.: 170,683

[22] Filed: Dec. 20, 1993

Related U.S. Application Data

[63] Continuation of Ser. No. 954,006, Sep. 30, 1992, abandoned.

[51] Int. Cl.⁶ .............................................. G02B 23/00
[52] U.S. Cl. ..................... 359/400; 359/417; 359/410
[58] Field of Search ............... 359/417, 400, 412, 411, 359/410, 407; 250/214 VT

[56] References Cited

U.S. PATENT DOCUMENTS

| | | | |
|---|---|---|---|
| 2,712,773 | 7/1955 | Merrick | 359/417 |
| 3,454,773 | 7/1969 | Bulthues et al. | 359/412 |
| 3,914,012 | 10/1975 | Boughton | 350/75 |
| 4,013,340 | 3/1977 | Mukai et al. | 350/36 |
| 4,186,992 | 2/1980 | Kamakura | 350/36 |
| 4,202,598 | 5/1980 | Jenkins | 350/36 |
| 4,205,894 | 6/1980 | Filipovich et al. | 359/400 |
| 4,226,129 | 5/1981 | Versteeg et al. | 250/330 |
| 4,284,325 | 8/1981 | Ishibai et al. | 350/36 |
| 4,306,764 | 12/1981 | Kikuchi | 350/76 |
| 4,323,298 | 4/1982 | Brennan | 359/400 |
| 4,449,787 | 5/1984 | Burbo et al. | 359/410 |
| 4,463,252 | 7/1984 | Brennan et al. | 250/214 VT |
| 4,653,879 | 3/1987 | Filipovich | 359/400 |
| 4,655,562 | 4/1987 | Kreitzer et al. | 359/400 |
| 4,867,533 | 9/1989 | Akin, Jr. | 350/253.2 |
| 4,915,487 | 4/1990 | Riddell, III et al. | 359/630 |
| 4,986,644 | 1/1991 | Yang | 359/410 |
| 5,029,963 | 7/1991 | Naselli et al. | 350/96.18 |
| 5,084,780 | 1/1992 | Phillips | 359/350 |
| 5,121,045 | 6/1992 | Caserta et al. | 320/13 |

FOREIGN PATENT DOCUMENTS 0469942  7/1991  European Pat. Off. .

*Primary Examiner*—Loha Ben
*Assistant Examiner*—Steve Kong
*Attorney, Agent, or Firm*—Arthur L. Plevy; Patrick M. Hogan

[57] ABSTRACT

A night vision goggle device is fabricated for consumer use. The device employs interpupillary and diopter adjustments for each eye of the user. The combined adjustment mechanism incorporates manually operable control knobs located on the housing and one knob for each of the eye pieces. Each control knob is capable of moving both in a forward and rear mode and in a transverse mode. The knob can provide diopter focus adjustment for a front to back motion and for lateral movement or transverse movement the control provides for interpupillary adjustment. The movement of the knob and the removal of pressure or force from the knob enables the optical assemblies to be locked in position by a friction fit.

19 Claims, 4 Drawing Sheets

1

CONSUMER NIGHT VISION VIEWING APPARATUS

This is a continuation application under 37 C.F.R. 1.62 of prior Ser. No. 07/954,006, filed on Sep. 30, 1992, abandoned, entitled CONSUMER NIGHT VISION VIEWING APPARATUS.

FIELD OF THE INVENTION

The present invention relates, in general, to night vision goggles and in particular, to a consumer orientated night vision goggle system which incorporates interpupillary and diopter adjustment.

BACKGROUND OF THE INVENTION

Night vision gogles (NVG) are well known for their ability to enhance nighttime vision. The goggles employ intensifier devices which operate to multiply the incident light received to produce a display that is bright enough for presentation to the eyes of a viewer. As is known, the U.S. Military uses night vision goggles during nighttime operation to sight objects that otherwise would not be visible. Night vision goggles (NVG) have, because of the expense, been primary limited to military applications. Because of military specifications and designs, available night vision goggles are not suited for use in a consumer market place. A majority of night vision goggle users are assigned individual equipment and thus do not have to adjust the equipment to fit their psycho-physiological characteristics. A goggle for consumer use would have to allow for easy adjustment for multiple users in the dark environment that it is used in. Such a consumer device, as one can understand, should have various capabilities while not confusing the consumer and make it extremely easy for the consumer to handle and operate. Such a consumer device would have wide application in regard to nighttime marine piloting, nighttime security and surveillance, nighttime hunting, fishing, hiking and navigation, backpacking, search and rescue, underwater vision, nighttime recreation and nighttime law enforcement. The nighttime vision goggle, as indicated employs night vision technology which has been used by the military and one objective of the present invention is to provide an efficient and adaptable consumer device. As one can ascertain, ITT Corporation, the assignee herein has many patents, and has provided many devices for use in military nighttime vision applications. See for example U.S. Pat. No. 5,121,045 issued on Jun. 9, 1992 to J. N. Caserta, et al., entitled EMI PROOF BATTERY PACK FOR NIGHT VISION GOGGLES. See U.S. Pat. No. 5,084,780 issued on Jan. 28, 1992 to E. N. Phillips entitled TELESCOPIC SIGHT FOR DAY/NIGHT VIEWING. That patent describes a sight for a gun or other weapon which can be utilized for nighttime or daytime operation and which is particularly adaptable for use with weapons ranging from rifles to antitank weapons. See also U.S. Pat. No. 5,029,963 entitled REPLACEMENT DEVICE FOR A DRIVERS VIEWER by C. Naselli, et al., issued on Jul. 9, 1991. This patent describes image intensifier tubes which are utilized in night vision devices and which employ image intensifiers which are manufactured by ITT and which are designated as Generation III or GEN III devices. In the patent it is explained that a significant portion of the military and certain commercial night vision equipment currently in use were designated and designed to accommodate such image intensifier devices from the GEN 0 to the GEN III device.

As one can understand, a consumer night vision goggle (CNVG) should allow ease of use for the user. The device to be described may employ auto-focus and a power-focus mechanism to enable the user to control the focus by means of convenient switches. For example, in the auto-focus mode, the focus may be achieved by a control signal from a auto-focus transducer. The control signal may be fed into a control circuit that is used to drive a motor. The power drive is used to electronically focus the objective lens independently from auto-focus. Gain of the image tube is brought out to the user to allow for manual control of the device gain. Automatic gain control is accommodated employing circuitry in a high voltage supply. A major aspect of the present invention is the control of the interpupillary and the diopter focus adjustment which are employed with a manual control located on the housing, in the proximity of each of the eye pieces. Diopter adjustment and interpupillary control is achieved for each eye of a user and independent of one another. The control employs a single switch for both interpupillary and diopter adjustment to greatly simplify user interface. The diopter adjustment is controlled by utilizing a spring washer that is employed to enable a friction fit for operation of each of the mechanisms. In this manner, the consumer can adjust both the diopter focus and interpupillary distance by moving a single control knob. This adjustment can be made independently for both the right and the left eye of the consumer. In this manner, focus as well as interpupillary distance is achieved for each eye.

As one can ascertain from the above, night vision goggles (NVG) have been used extensively by the military and have had application in law enforcement and security. Such devices are sold as monocular devices which are fabricated by numerous companies or binocular devices or goggles. In any event, as alluded to above, such devices are expensive and over specified for commercial use. The control of such devices such as focusing and interpupillary adjustment is relatively difficult at night and prior art adjustment mechanisms are difficult to use, while assembly time is consuming and difficult.

In any event, there is described an improved consumer night vision viewing apparatus which avoids all of the above problems and which is extremely simple and inexpensive to both produce and fabricate.

SUMMARY OF THE INVENTION

Night vision goggle apparatus for providing an intensified image for each of the eyes of a user, with the image provided by an image intensifier having an output directed through optics to the right and left eye of a user of said goggle apparatus with said optics including a right diopter assembly for right eye viewing and a left diopter assembly for left eye viewing, said goggle apparatus included in a housing containing said intensifier and said optics, in combination therewith apparatus for providing diopter and interpupillary distance adjustments for said user comprising:

a first and second manually movable control means located on said housing with said first control means associated with the right eye of said user and with the second control means associated with the left eye of said user, each control means coupled to one of said associated diopter assembly to enable a user to move said control means in first directions to enable diopter focusing of said assembly and in second transverse directions to enable interpupillary adjustment, whereby said adjustments are independent for each eye as accommodated by said associated control means.

BRIEF DESCRIPTIONS OF THE FIGURES

DETAILED DESCRIPTION OF THE FIGURES

Figure 1:
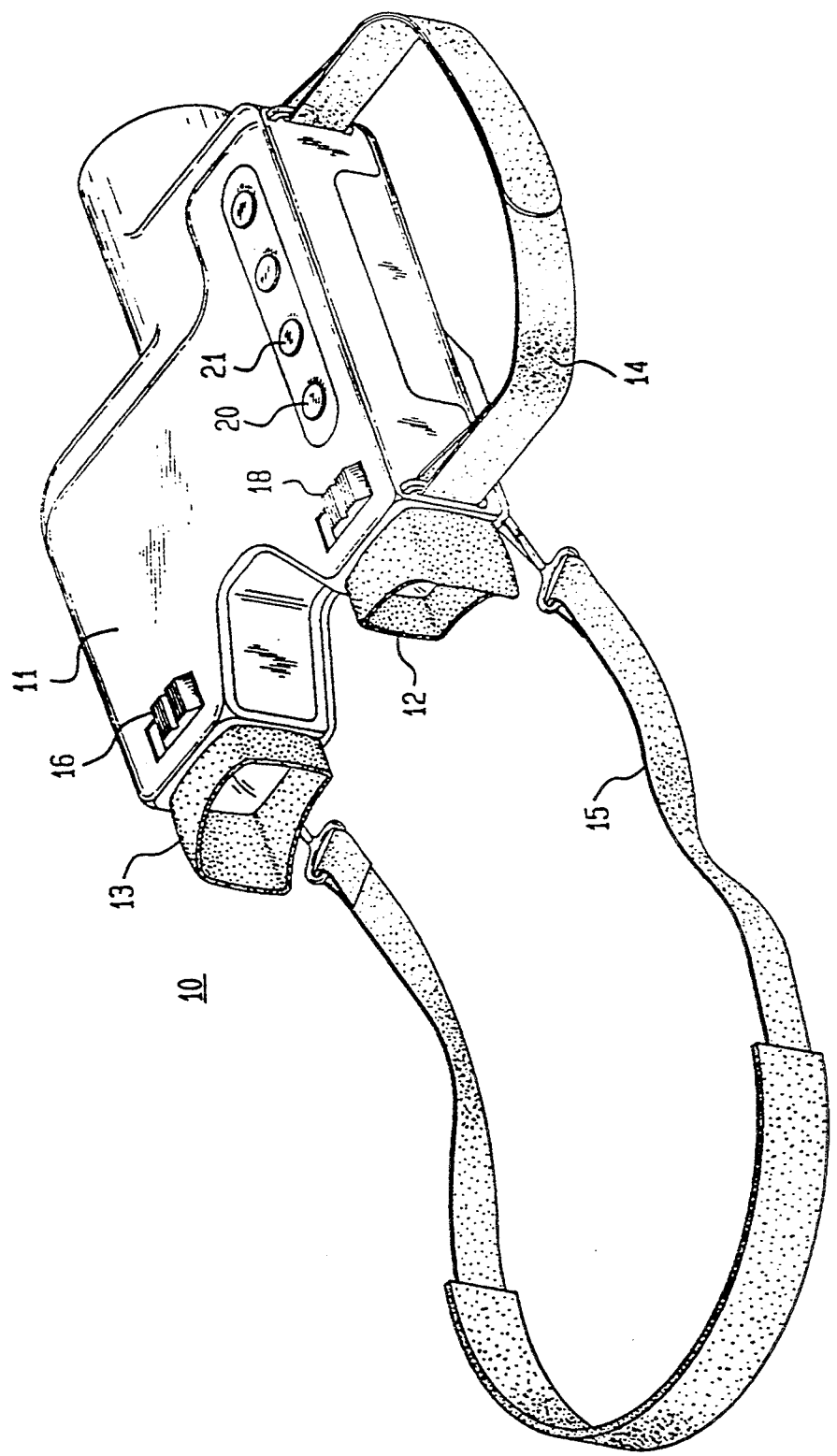
FIG. 1 is a perspective plan view of a night vision goggle device according to this invention.

Referring to FIG. 1 there is shown a perspective view of a consumer night vision viewing device 10 or consumer night vision goggles according to this invention. FIG. 1 displays a perspective view of a housing assembly 10 which is configured to house a night vision device as an image intensifier and associated optics and which device can be employed for consumer applications. The housing 11 is fabricated as two parts or two sections and which housing contains the image intensifier tube, as well as optical assemblies in order to provide images for both the left and the right eye of the viewer. There is shown eye cups or eye input means 11 and 12 to enable a viewer to place the device against his eyes and to view images at night. Coupled to the housing is a strap 14 to enable the viewer to carry the assembly, as well as a neck or shoulder strap 15 which is conventionally attached to the housing.

As shown, there are series of buttons or controls located on the top surface of the housing 11. It is immediately understood that the location of the buttons can be varied. For example, shown in FIG. 1 are control knobs 16 and 18 which as will be described, can be operated by the consumer or the user to vary both the interpupillary distance, as well as a diopter focusing adjustment of the device. This can be done for each eye. As is well known, interpupillary distance varies from individual to individual as the distance between the centers of each eye is different for each individual. This depends on the size of the individual's head or the spacing between the eyes in general. Thus, as will be explained, the interpupillary distance as the distance between the optical axis of the eyes can be adjusted by moving each lens assembly associated with the eye inputs 11 and 12 to the left or right. This control is implemented by means of the knobs 16 and 18 which as indicated are shown on the top surface of the housing 11, but can be positioned on the bottom surface of the housing as well as a side surface and so on.

Simultaneous or individual movement of knobs 16 and 18 to the left and the right enables interpupillary adjustment as will be further explained. Movement of the knobs 16 and 18 from front to back enables diopter adjustment for each eye. Thus, the use of a single control knob as 16 and 18 can provide both diopter adjustment, as well as interpupillary adjustment. A series of other buttons or controls appear on the top surface of the unit 10 which are designated by reference numerals 20 and 21. These can be utilized to provide automatic focus and other features which can be accommodated by the night vision apparatus 10.

Figure 2:
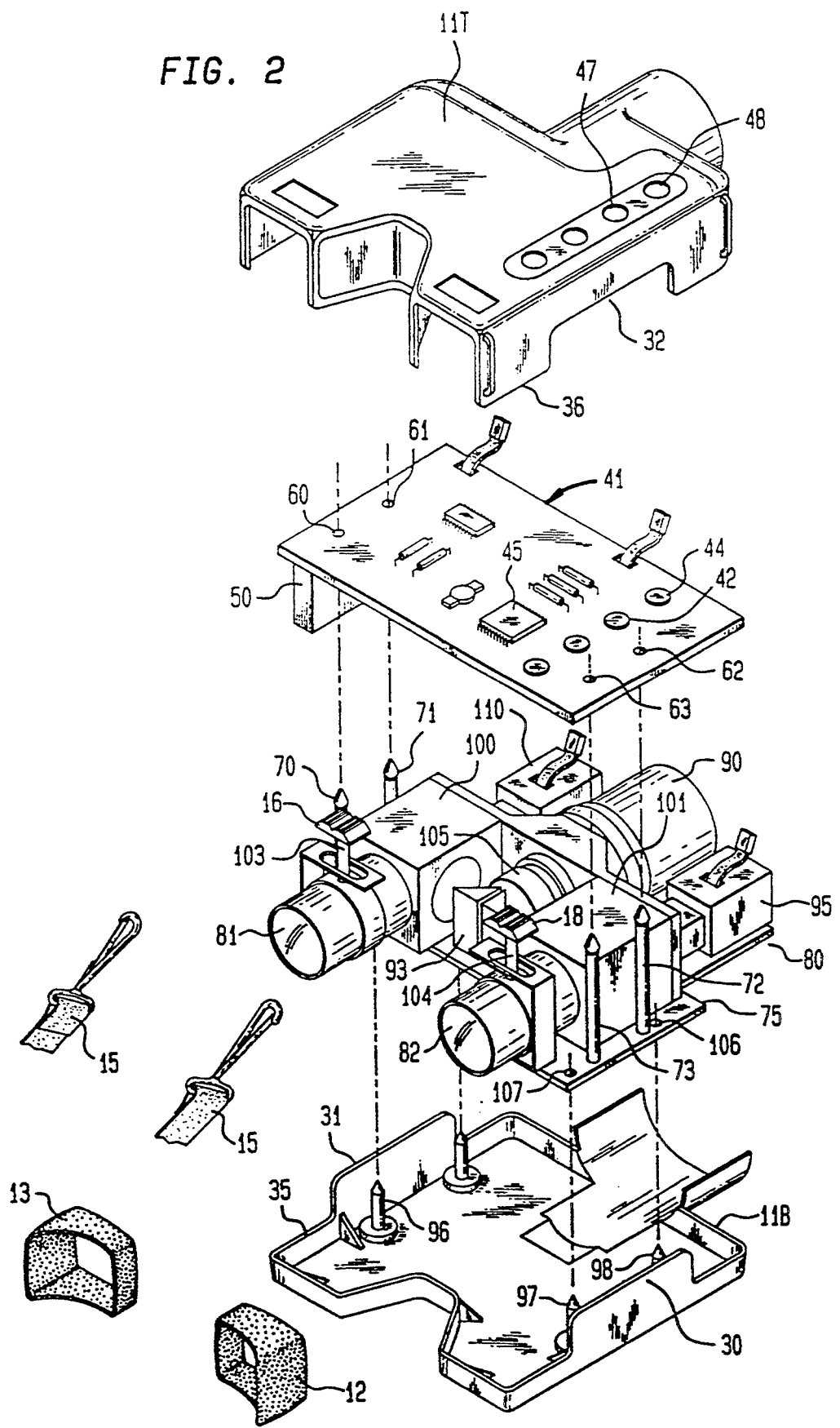
FIG. 2 is a exploded assembly view depicting the night vision device of FIG. 1.

Referring to FIG. 2, there is shown an exploded assembly view of the night vision goggle device 10 as depicted in FIG. 1. As one will ascertain, the housing 11 consists of a top housing section 11T and a bottom housing section 11B. The housing sections 11T and 11B interlock or fit together and are secured together by means of suitable fastener assemblies. As one can see, the bottom housing 11B has an upstanding right flange 30 and a similar left flange 31. The flanges 30 and 31 communicate with accommodating congruent recesses, such as recess 32 shown in the top side 11T of the housing. The bottom housing and top housing basically are configured so that the upstanding peripheral flange as flange 35 of the bottom housing 11B communicates with and is directly aligned with the bottom peripheral flange 36 associated with the top housing section 11T. The housing 11T and 11B are fabricated or molded from a sturdy flexible plastic. The housing sections 11T and 11B are secured together and can be coupled at the peripheral flanges by means of a gasket (not shown) or otherwise to provide a water tight seal.

As seen in FIG. 2, an electrical assembly board 41 is accommodated within the housings and contains switch modules, such as modules 42 and 44 which are inserted in and aligned with the holes 47 and 48 in the top housing section 11T. The switches 44 and 41 are similar to switches or controls 20 and 21 of FIG. 1. The assembly board 41 contains various integrated circuits, such as integrated circuit module 45. In any event, the circuit board 41 is associated with a spacing flange 50. As seen the board 41 has apertures 60 and 61 on the left and 62 and 63 on the right. The apertures communicate with upstanding posts, such as 70 and 71 and 72 and 73 which posts enable the assembly circuit board 41 to be positioned and held above the optical assembly 80. As seen, the posts, such as 72 and 73 are positioned on extending flanges as flange 75 shown on the right hand section of the optical assembly 80. The optical system contains ocular lens assemblies 81 and 82 which are associated with, as will be explained, diopter assemblies 100 and 101. Essentially, the diopter and interpupillary control knobs 16 and 18 are coupled by means of drive shafts to each of the diopter assemblies 100 and 101. The control shafts such as shaft 103, associated with control knob 16 and shaft 104 associated with control knob 18 allow one to move the diopter lens assembly to provide focus and to move the diopter assemblies to provide interpupillary adjustment. The shafts 103 and 104 are coupled to each of the diopter assemblies to enable the diopter assemblies to move from left to right or from front to back to provide both diopter adjustment, as well as interpupillary adjustment. The centers of the ocular or diopter lenses 81 and 82 move laterally as controlled to afford interpupillary adjustment and further move in and out to perform focusing. The exact mechanism for moving the diopter assemblies 100 and 101 will be described in conjunction with FIGS. 3 to 6. The structure depicted in FIG. 2 is for convenience of explanation. There is a prism 93 associated with a central/optical relay lens assembly 105 which is coupled to the light output of an image intensifier tube contained in section 90. The light from the image intensifier tube and via the assembly 105 is directed through the prism 93 where it splits and then impinges upon mirrors associated with each of the diopter assemblies 100 and 101. Thus a separate intensified light image is directed to each eye of a viewer via the lens systems 81 and 82. The systems 81 and 82 are coupled to the eye cups 11 and 12 shown in FIGS. 1 and 2. In this manner, there is provided a first light path for the right eye of a viewer and a second light path for the left eye of the viewer.

As one can see, the bottom housing section 11B has upstanding post members such as 96, 97 and 98 which members accommodate the apertures contained in the flanges associated with the optical housing 80, such as apertures 106 and 107 located on flange 75. In this manner, the entire assembly is easily inserted together and secured between the clamshell housing consisting of the top section 11T and the bottom section 11B. The housing, as indicated, is basically of a clamshell configuration fabricated from a plastic which is molded. A high voltage supply which is contained on the circuit board 41 provides power to the image intensifier tube contained in the cylindrical section 90. The objective lens of the image intensifier tube is controlled electronically by means of a servomotor 95 which is contained in the housing. The servomotor 95 is used to drive the objective lens to a focus. A housing module 110 contains an automatic focus transducer. Automatic focus can be accomplished by means of ultrasonic or microwave signals utilizing the well known Doppler effect. Such devices are commercially available and for example an ultrasonic device is sold by the Polaroid Corporation. In any event, automatic focusing can be implemented by means of ultrasonic or microwave transducers which are available from many companies and are well known in the state of the art. Such a transducer is mounted in housing assembly 110 and thus automatic focus is used to adjust the objective lens depending upon the distance to the target. The focus mechanism is controlled by electronic switches such as 41 and 44 which are contained on the electrical circuit board 41. As seen, the light input to the image intensifier 90 is imaged through the optical assembly including prism 93 so that it directed to both eyes of the user. The interpupillary distance control and the diopter focus adjustment for each eye is controlled by a single control, as for example knob 16 for the left eye and knob 18 for the right eye. The single control knob is used to adjust both diopter focus and interpupillary distance for each eye independently. The adjustment uses a friction fit that is tuned to allow for both lateral and for/aft adjustment.

As one can understand, some of the main features are shown in FIGS. 1 and FIG. 2. It is also understood that the night image device can be configured with automatic tube gain control and manual gain control. Manual gain control can be implemented by means of switches which are located on the electrical circuit board and the control of gain manually or automatically is both well known. The electronics can include a high level cutoff circuit to prevent damage to the image intensifier and a timeout electronic circuit to prevent damage and preserve battery life. High level cutoff circuitry, in association with image intensifiers are well known. Such circuitry can be contained on the electrical circuit board 41. As one can ascertain, optical path alignment is achieved by mechanical tolerances of the molded housing parts 11T and 11B. The housing is a two piece clamshell molded part that is easily fabricated. The optical bed for the assembly 80 is molded into the device housing where the apertures in the flanges 106 and 107 coact with the upstanding posts 97 and 98. The posts are molded directly on the bottom housing assembly 11B. This molding can take place whereby the entire base of the optical assembly may be formed with the bottom section 11B. The housing is a two piece clamshell molded part that can be fabricated from a flexible plastic, such as polypropylene, polyethylene and so on, and where the peripheral flanges 30 and 36 interlock by means of a conventional waterproof seal, such as an elastomeric gasket. Based on the construction, the device is light weight and water resistant. The contoured eye cups 11 and 12 are extremely comfortable and provide a very tight fit for the eyes of typical individuals. The device has an easy gripping finish and contains an image intensifier tube that enables operation resulting in light amplification of up to 2,000 times. Thus, the device can operate under starlight conditions and is operated by rechargeable batteries. The device has the flexible and protective carrying case or housing which consists of the two parts or sections 11T and 11B and also may include the shoulder strap 15 and the handle 14. The device employs F/1.17 optics with a 40° field of view (FOV) and has an automatic shut-off feature. With such a device, consumers such as boaters can identify objects detected on radar, read channel markers, view land marks, detect navigational hazards, identify approaching vessels and so on. The uses of such a device are extremely widespread and can be used for all sorts of activities. The device can include an automatic gain control which assures a consistent level of brightness and operates on rechargeable batteries. In any event, such features are easily accommodated in the designs shown in FIGS. 1 and 2.

Figure 4:
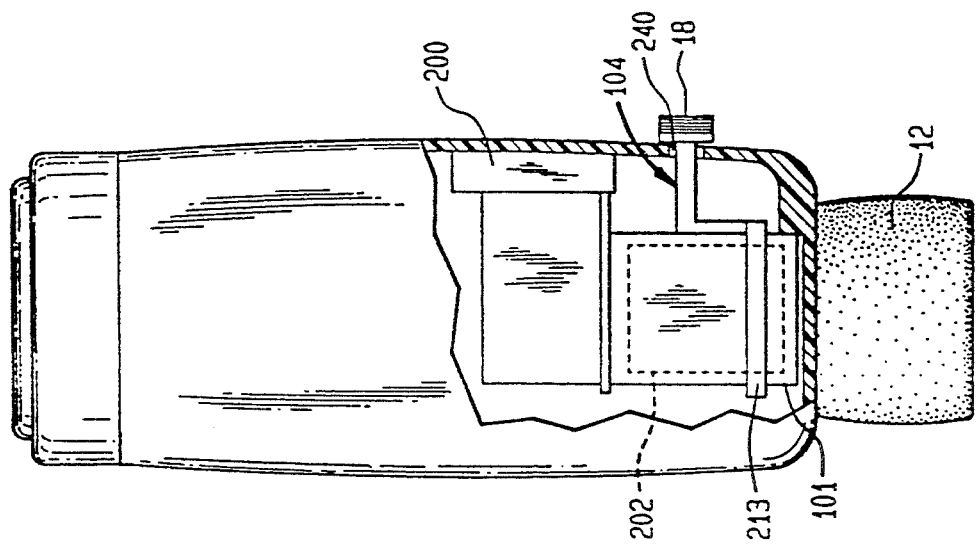
FIG. 4 is a side view showing the apparatus of FIG. 3.
Figure 3:
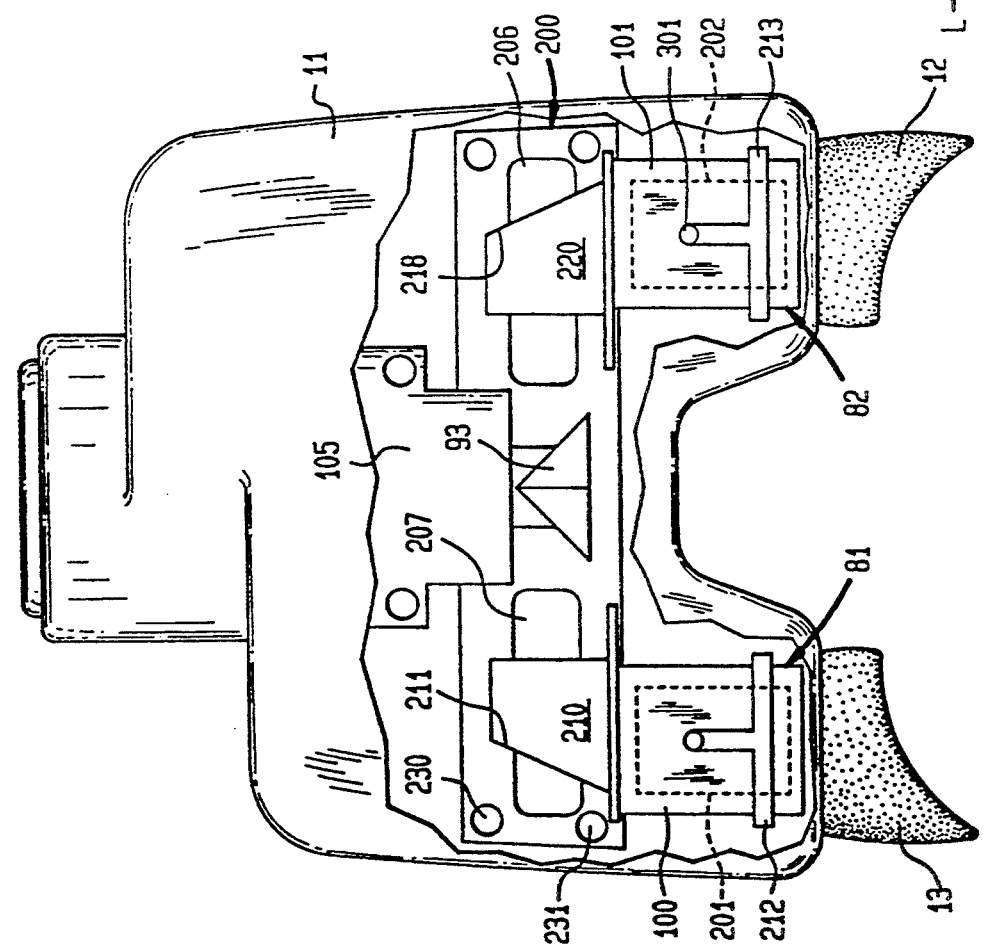
FIG. 3 is a top view with a portion of the housing removed to depict an interpupillary and diopter adjustment according to this invention.

Referring to FIGS. 3 and 4, there is shown respectively a top view in FIG. 3 of the housing 11 with a cutout showing the diopter adjustment and interpupillary adjustment mechanism according to this invention. FIG. 4 depicts a side view of the housing 11 with a suitable cutout to show the adjustment mechanism of FIG. 3 from the side. As indicated, the housing assembly which consists of the top housing portion 11T and the bottom housing portion 11B contains the optical sub-assembly which is depicted in FIG. 2 as module 80. In any event, the input optics as 81 and 82 are each associated with an ocular or eye cup 11 and 12. The modules 100 and 101 consist of a relatively cylindrical front housing portion as shown. The cylindrical housings 100 and 101 contain a diopter lens which is a concave assembly and operates to converge light. The lens is positioned in an inner cylindrical tube which is slideably mounted in the outer tube to form the telescoping housing portions 100 and 101. The dashed lines depict the diopter lens assemblies 201 and 202 which are contained in the cylindrical or tubular housing portions 100 and 101. Also coupled to and associated with the tubular portions 100 and 101 are further optical housings sections 210 and 220. Each of the sections 210 and 220 is associated with a suitable mirror 211 and 218 and optical system (a lens) which enables the prism 93 (also see FIG. 2) to direct light incident on the slanted surfaces of the prism through the lens assemblies in 210 and 220 where the light is reflected off the mirror surfaces 211 and 218 and is directed to the associated eye of the viewer via the lens assemblies 201 and 202. Each of the cylindrical sections 100 and 101 are coupled or otherwise secured to annular rings 212 and 213. The annular rings are coupled to the outer housing assembly to maintain the proper alignment and orientation of the assemblies 100 and 101. The inner lens assembly moves to provide diopter focusing within predetermined limits as will be described. Thus, as one can see from FIG. 3, each ocular input or eye piece such as 11 or 12 is associated with a separate diopter lens assembly 201 and 202 which are part of the diopter assemblies. Each diopter assembly has a rear housing portion 210 and 220 which are inserted or positioned within slots 206 and 207 in a carriage slide member 200. The slots 206 and 207 are each of a predetermined length and a predetermined width and essentially slots 206 and 207 are formed on the surface of the carriage slide member 200. The carriage slide member 200 is a mechanical assembly which is secured to the housing by fastening means coupled within the apertures 230 and 231. The apertures 230 and 231 cooperate with the upstanding posts 96, 97 and 98 to enable the assembly to be fixed and secured in place. The posts can be compressed or otherwise fastened to the carriage slide member 200 by many known and conventional means. As seen also in FIG. 2, the prism 93 is positioned on the top surface of the slide carriage slide member 200.

Shown in FIG. 4, the diopter assembly 101 is associated with a drive shaft 103 which in turn is coupled at one end to the control knob 18. It is also indicated that while the control knobs 16 and 18 are shown in FIG. 2 on the top of the housing they can be located on the bottom of the housing. Thus, the knobs 16 and 18 can be positioned on the bottom portion 11B of the housing, as opposed to the top portion 11T of the housing. In any event, the control shaft 104 is rigidly secured to the control knob 18 at one end and to the diopter assembly section 101 at the other end. The control shaft 104 is positioned in slot 240 formed in the housing 11. As will be explained the shaft 104 is coupled to the lens assembly housing to move the housing and therefore move the lens for focussing. The shaft 104 also moves the lens housing transverse to the focusing direction for interpupillary control. It is understood that the same mechanism is present for the diopter assembly 100 which includes the control knob 16 and the drive shaft 103. Thus, by manipulating the control knob 18, one can move the diopter assembly 101 within the slot 206 in the direction shown by arrows designated L-R for left to right. The single control knob 16 or 18 can also move the diopter assembly in and out or front to back (F-B) thus achieving diopter focus adjustment. This adjustment is implemented individually for each eye. Thus, by moving the control knob in the direction of the LR arrow or left to right, one can change the interpupillary distance or the distance between modules 100 and 101 for each eye. The entire structure is held in place by a friction fit. In this manner, positioned beneath the apertures 206 and 207 in the slide carriage assembly 200 are friction spring devices, such as a wavey-spring or for example an elastomeric plate. The control knobs 16 and 18 move the optical assemblies 100 and 101 in the directions indicated by the arrows (L-R and F-B). Once the control knob is released, both optical assemblies stay in place due to the friction fit. Thus, the adjustment once made remains in place by the friction fit which can be implemented using a wavey-spring washer that can be used to tune the friction and the feel of the control. Thus, each control knob enables focus to be achieved for each eye. In the same manner, one can move each diopter assembly left and right to obtain interpupillary distance adjustment. A wavey-spring washer or other device provides enough friction so that by releasing the control knob after proper adjustment is achieved, one can be assured that the desired position is maintained.

Figure 5:
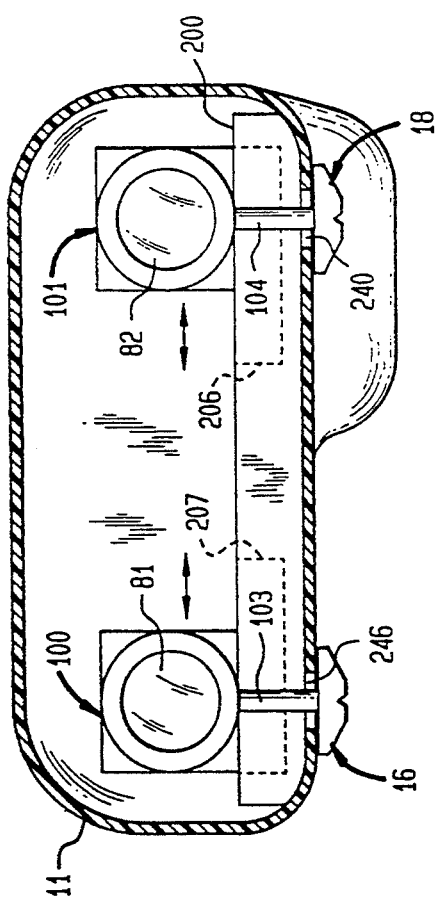
FIG. 5 is a front view showing the apparatus for interpupillary and diopter adjustment.

Referring to FIG. 5 there is shown a simplified front view whereby the control shafts 103 and 104 are seen positioned in slots 240 and 246 to enable the diopter assemblies 100 and 101 to be moved left or right to perform interpupillary adjustment. There is also shown the carriage slide member 200 with the slots 206 and 207 depicted in dashed line. The slots as 240 and 246 are rectangular in shape and have a specific distance from left to right and a specific distance from front to back. In this manner, the optimum control of the optical assemblies can be implemented from a minimum point to a maximum point. The interpupillary distance can be varied to accommodate the variation in the interpupillary distance of the average population. In this manner, both interpupillary distance and diopter focusing can be accommodated in a simple, expedient manner.

Figure 6:
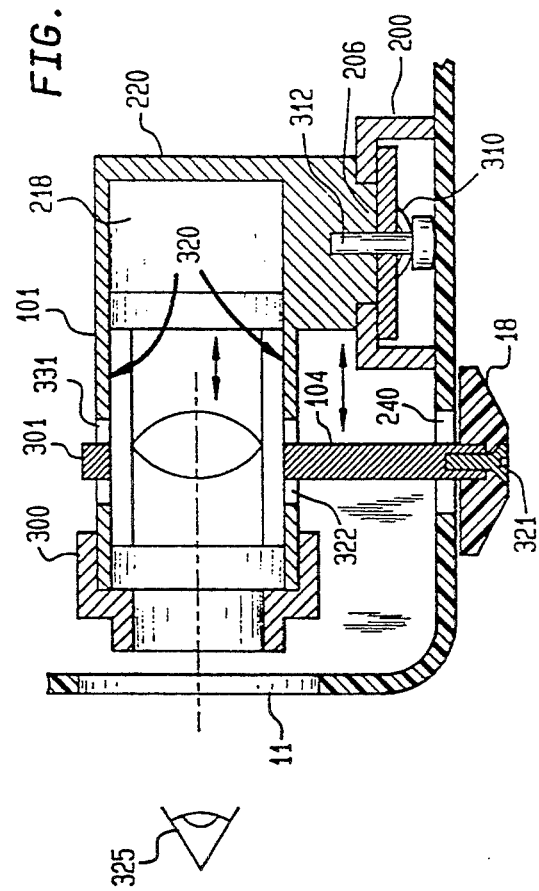
FIG. 6 is a cross-sectional view showing the adjustment mechanism according to this invention.

Referring to FIG. 6, there is shown a side view, as the view in FIG. 4 which is partially cross-sectioned to show some of the components as well as the mechanisms for securing the diopter assembly to the carriage slide member 200. As seen in FIG. 6, the housing 11 is shown. At the end of the diopter optical assembly 101 is an end cap 300 which enables the eye cup, as 11 and 12 to be inserted over the end cap and enables the eye 325 of a viewer to view through the diopter optical assembly 101. The diopter optical assembly 101, as shown in the Figure, contains a diopter lens 305 which lens is secured within the inner cylindrical portion 321 of the housing 101. There is also shown a mechanical stop 301 which is coupled to the housing portion 321 and rides in the slot 331. The slot 331 is wide enough to encircle the stop 301, and the stop 301 acts to push the lens assembly housing 101 when the knob 18 is moved in a direction to provide interpupillary adjustment. The stop 301 is formed as part of the annular retaining ring 213 of FIG. 2. In any event, the inner cylindrical assembly 321 containing the lens 305 is secured to one end of the drive shaft 104 which is in turn secured to the control knob 18 at the other end by means of the screw 321 or any suitable mechanism. As indicated, the control shaft 104 can move within the aperture 240 in the housing. Thus, by moving the knob 18 in this case to the right or left, the lens 305 moves as limited by the slot 331 and stop 301. The housing section 220 can move within the aperture 206 in the carriage slide member 200.

As seen, the diopter housing assembly portion 220 can move in and out of the paper at a distance depending upon the length of the aperture 206 to provide interpupillary distance adjustment. As described, the inner cylinder 321 slides within the outer cylinder 101. The control shaft 104 is coupled to the inner cylinder 321 and the apertures 240 and 331 enables one to move the diopter lens 305 in the direction of the arrows or in this particular case to the left or right in FIG. 6. In any event, the direction that the diopter lens 305 moves when the control knob 18 is moved is in the left or right direction or in a direction to provide focusing. The mirror surface 218 is shown which is analogous to surface 218 shown in FIG. 3. In any event, the entire mechanism can also move in the direction as in and out of the paper by moving the control knob in that direction to provide interpupillary adjustment. In this manner, there is a slide member 310 which essentially rides within the slot 206. The slide 310 abuts against the side surfaces about the slot 206 and is held in position by means of a spring washer 310. The washer 310 essentially is a wavey-spring washer which is secured by means of adjustable bolt 312 which can be adjusted in pressure to thereby adjust the friction between the spring washer and the slide member as abutting against the flange walls about aperture 206 of the carriage slide member 200. The friction can be adjusted to enable the control knob 18 when moved in and out of the paper to adjust the interpupillary distance for each eye and to assume the desired position. A movement of the control knob 18 to the left or right also adjusts the diopter focus by moving the lens 305. While one friction fit apparatus is depicted in FIG. 6, it is known that other techniques can be employed as well.

Thus, there has been described a night vision goggle device for consumer use which is simple to fabricate and employs interpupillary and diopter focus adjustment implemented with a manual control located in the proximity of each of the eye pieces. The use of the single mechanism for both interpupillary and diopter adjustments simplify user interface. The device is capable of providing vision under starlight conditions and collects available light and amplifies it up to 2,000 times utilizing image intensifiers manufactured by ITT Corporation. The device can include automatic focus with manual focus power override. The device is water resistent and fabricated from a light weight strong plastic. The device can float and employs a clamshell housing configuration comprising a top and a bottom section which are fitted together to provide a compact and extremely light unit.

What is claimed is:

1. Night vision apparatus for providing an intensified image for each of the eyes of a user, with the image provided by a single image intensifier having an output directed through optics and divided to the right and left eye of a user of said night vision apparatus with said optics including a right diopter assembly for right eye viewing and a left diopter assembly for left eye viewing, said night vision apparatus included in a housing containing said image intensifier and said optics, in combination therewith an apparatus for providing diopter and interpupillary distance adjustments to said right diopter assembly and said left diopter assembly, comprising:

a first and second manually movable control means located on said housing with said first control means coupled to said right diopter assembly and with the second control means coupled to said left diopter assembly, wherein the first and second control means enable a user to independently move said right diopter assembly and said left diopter assembly in first directions for diopter focusing of each diopter assembly and in second transverse directions to enable interpupillary adjustment.

2. The night vision apparatus according to claim 1, wherein said first and second control means include first and second control knobs.

3. The night vision apparatus according to claim 1, further comprising:

a slide carriage positioned inside said housing and having a right aperture for accommodating said right diopter assembly and a left aperture for accommodating said left diopter assembly, each aperture dimensioned to enable each diopter assembly to move in said transverse directions to enable interpupillary adjustment.

4. The night vision apparatus according to claim 2, wherein said first and second control knobs are coupled to one end of an associated drive shaft with the other end of said shaft coupled to an associated diopter assembly, with each shaft coupled to said control knob associated therewith, via an aperture in said housing, which aperture in conjunction with said slide carriage aperture determines a distance said diopter assemblies can move in said first directions and said second traverse directions.

5. A night vision apparatus for providing an intensified image for each of the eyes of a user, comprising:

a hollow housing, an image intensifier located in said housing and operative to receive a low level light at an input to provide a high light level at an output, beamsplitter, optically aligned with said output to provide a first light path for a right eye of a user and a second light path for a left eye of a user, a first diopter assembly located in said housing and positioned to intercept said first light path to provide an optical image for the right eye, and a second diopter assembly located in said housing and positioned to intercept said second light path to provide an optical image for said left eye of the user, first and second control means movably mounted on said housing, each control means operative to move in a first direction and a second direction transverse to said first direction, with said first control means coupled to said first diopter assembly and with said second control means coupled to said second diopter assembly, and a carriage means coupled to said first and second diopter assemblies to enable said assemblies to move a given distance in said second direction, wherein said control means can move said associated diopter assembly in said first direction for adjusting focus and in said second direction for adjusting an interpupillary distance associated with said first diopter assembly and said second diopter assembly.

6. The apparatus according to claim 5, wherein said first and second control means include first and second control shafts each having one end coupled to an associated knob, each knob movably positioned on said housing and adapted to move, with each shaft coupled to said knob via an aperture in said housing with the other end of each shaft coupled to said diopter assembly associated therewith.

7. The apparatus according to claim 6, wherein each diopter assembly includes a lens assembly slideably inserted in a diopter lens assembly housing with said shaft having said other end coupled to said lens assembly to move said lens when said knob moves said shaft in the first and second directions, and said diopter assembly having a second housing section contiguous with said lens assembly housing and slideably positioned in an aperture in said carriage means to enable said diopter lens assembly to move in said second direction transverse to said first direction to provide interpupillary adjustment.

8. The apparatus according to claim 7, further including:

friction means coupled between said carriage means and said second housing section to provide a friction fit to maintain said associated diopter assembly in an adjusted position after movement of said diopter assembly by said user.

9. The apparatus according to claim 7, wherein said friction means includes a spring-washer coupled between said second housing section and said carriage means with said washer located in said aperture and abutting against said carriage means, and means coupled to said washer for adjusting the friction between said housing and said carriage means.

10. The apparatus according to claim 5, wherein said control means are located on a top surface of said housing.

11. The apparatus according to claim 5, wherein said control means are located on the bottom surface of said housing.

12. The apparatus according to claim 7, wherein said hollow housing comprises an upper housing section and a lower housing section, each section having a depending peripheral flange, with one of said sections having a recess on said depending flange with said other section having a projection which is positioned and shaped congruently to said recess to enable said upper and bottom sections to interlock to form said hollow housing.

13. The apparatus according to claim 12, further including first and second ocular inputs for respectively accommodating the right and left eye of a user, and positioned on a front surface of said housing between the upper and lower housing sections, with said right ocular positioned to receive said first light path and said second ocular positioned to receive said second light path.

14. The apparatus according to claim 13, wherein said first ocular input includes a first eyecup for accommodating the right eye of a user and a second eyecup coupled to said second ocular for accommodating the left eye of a user.

15. The apparatus according to claim 14, wherein said first control means is mounted on said top surface of said housing near said first eyecup and said second control means is mounted on said top surface of said housing near said second eyecup.

16. The apparatus according to claim 15, wherein said first control means is mounted on said bottom surface of said housing near said first eyecup and said second control means is mounted on said bottom surface of said housing near said second eyecup.

17. The apparatus according to claim 12, wherein said upper and lower housing sections are molded from a flexible plastic.

18. The apparatus according to claim 12 further including strap means coupled to said housing to assist a user in transporting said device.

19. The apparatus according to claim 5, wherein said first and second diopter assemblies each include at least one focusing lens.

* * * * *